(12) United States Patent
Iwasaki et al.

(10) Patent No.: US 6,566,999 B2
(45) Date of Patent: May 20, 2003

(54) ANTI-COLLISION SUPPORT SYSTEM AND METHOD FOR AUTOMOTIVE VEHICLE

(75) Inventors: Masahiko Iwasaki, Yokohama (JP); Mitsuaki Hagino, Kanagawa (JP); Junichi Kasai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/956,076

(22) Filed: Sep. 20, 2001

(65) Prior Publication Data

US 2002/0057194 A1 May 16, 2002

(30) Foreign Application Priority Data

Oct. 12, 2000 (JP) .................................. 2000-311446

(51) Int. Cl.⁷ ................................................ B60Q 1/00
(52) U.S. Cl. ...................... 340/435; 340/903; 340/436; 340/901
(58) Field of Search ................................ 340/435, 436, 340/901, 995, 998, 990, 903; 701/208, 217; 180/167, 169, 170, 271

(56) References Cited

U.S. PATENT DOCUMENTS

| | | | | |
|---|---|---|---|---|
| 4,931,930 A | * | 6/1990 | Shyu et al. ................. | 701/365 |
| 5,177,685 A | * | 1/1993 | Davis et al. ................. | 340/988 |
| 5,631,639 A | * | 5/1997 | Hibino et al. ............... | 340/903 |
| 5,818,355 A | | 10/1998 | Shirai et al. ................ | 340/903 |
| 5,941,934 A | * | 8/1999 | Sato .......................... | 701/217 |
| 5,948,035 A | | 9/1999 | Tomita ........................ | 701/70 |
| 6,253,150 B1 | * | 6/2001 | Nakamura .................... | 340/901 |

FOREIGN PATENT DOCUMENTS

JP          7-72246           3/1995

* cited by examiner

*Primary Examiner*—Van Trieu
(74) *Attorney, Agent, or Firm*—Foley & Lardner

(57) ABSTRACT

In anti-collision support method and apparatus for an automotive vehicle, a deceleration magnitude adjustment manipulation distance which is another vehicular running distance required to carry out a manipulation of an adjustment for a magnitude of the vehicular deceleration which would ordinarily be carried out at a time immediately before the vehicle is stopped is calculated from the vehicular velocity and the relative distance, a vehicular occupant is informed of an approach of the vehicle to the stop target object while the relative distance is shorter than a distance of the vehicle to a deceleration start position which is determined with the calculated deceleration magnitude adjustment manipulation distance taken into consideration and is shorter than a distance of the vehicle to the stop target object.

21 Claims, 7 Drawing Sheets

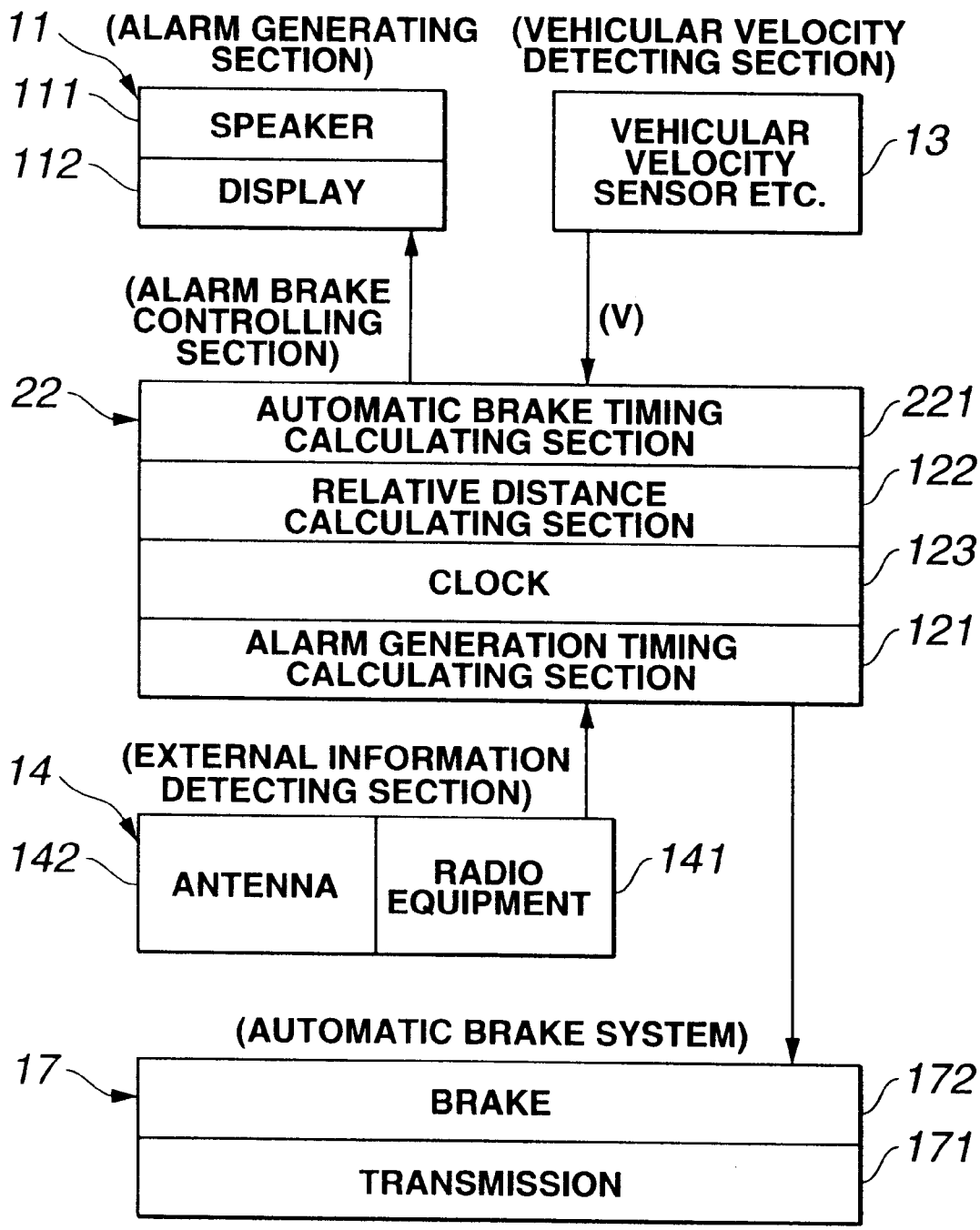

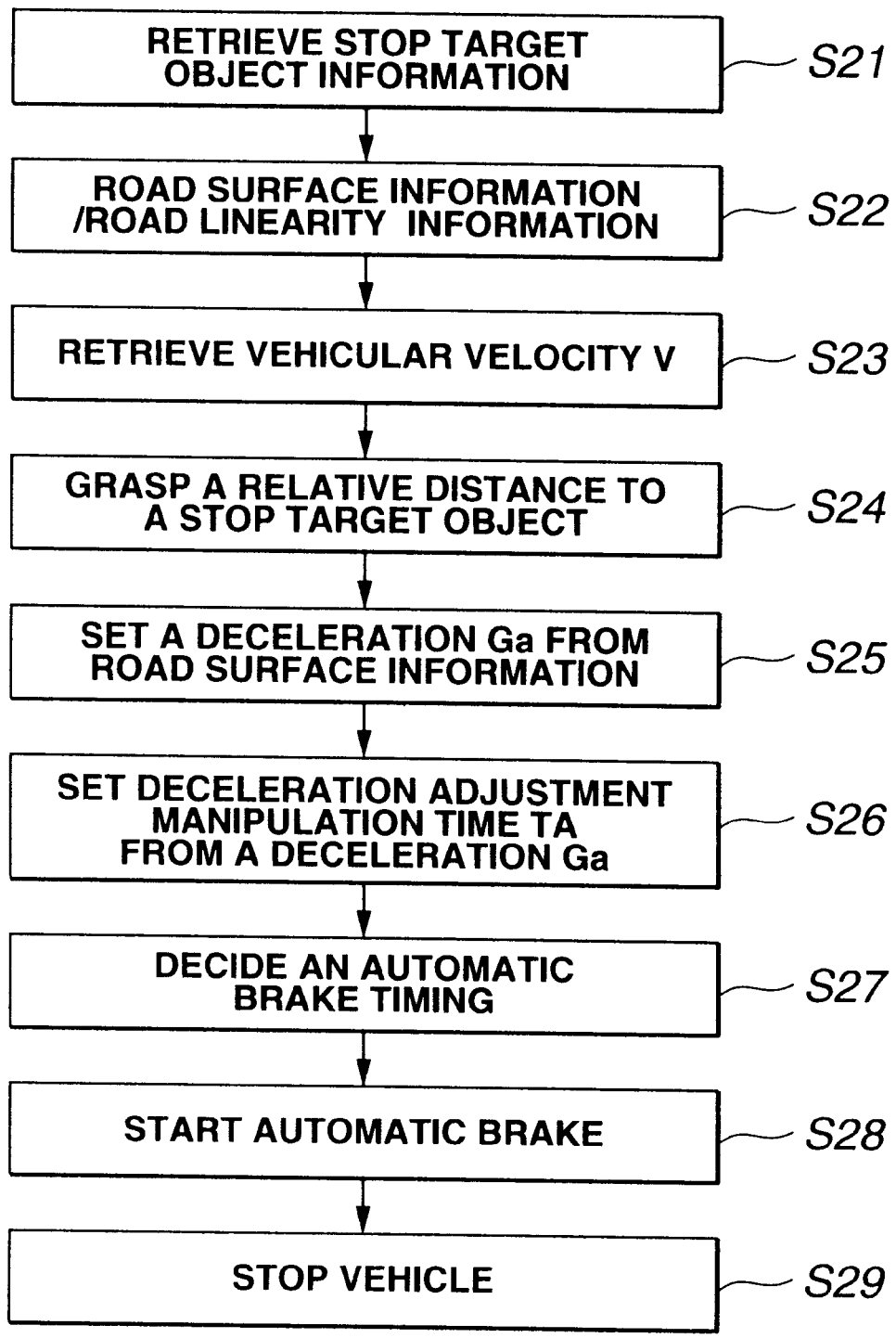

ANTI-COLLISION SUPPORT SYSTEM AND METHOD FOR AUTOMOTIVE VEHICLE

BACKGROUND OF THE INVENTION

1. Field of the Invention

The present invention relates to anti-collision support system and method having an alarming function which produce an alarm to a vehicular occupant and, preferably, having an automatic brake function which automatically applies a braking force to the vehicle to make an automatic stop for the vehicle, both functions being effected in a case where it is necessary to temporarily stop the vehicle due to an approach to a stop target object such as an obstacle or a temporary stop line at an intersection present in a forward direction of the vehicle.

2. Description of the Related Art

A Japanese Patent Application First Publication No. Heisei 7-72246 published on Mar. 17, 1995 discloses an automotive collision preventing alarm system (so-called, anti-collision support system).

In this collision preventing alarm system, a time duration (Time to Control=TC) for the vehicle to reach to an obstacle which provides a cause to apply a braking force to the vehicle is a sum of a response time duration (so called, a free running time) from a time at which the alarm is issued to a time at which a vehicular driver performs a braking operation and a deceleration time duration Td required for the deceleration. An alarm generating timing is defined as a time at which the host vehicle (the vehicle in-which the collision preventing alarm system is mounted) has reached to a point of location by a distance Lc (Lc=V×Tb+V×V/2Ga) with respect to the obstacle.

In other words, in such a previously proposed anti-collision support system as described in the above-identified Japanese Patent Application First Publication, a set-up of the alarm generating timing is determined only by a vehicular driver's braking operation response delay time (the free running time) Tb and the deceleration time Td required for the vehicular deceleration.

SUMMARY OF THE INVENTION

However, it is generally a common practice that the vehicular driver carries out such a deceleration magnitude adjustment manipulation as to suppress a nose dive (or squat) (a nose-down pitching phenomenon of the vehicle as on braking due to a vehicular body inertia) with a relieved damping force at a time point immediately before a vehicle stop. Otherwise, i.e., if the deceleration magnitude adjustment manipulation is not carried out, a large nose dive makes a vehicular occupant unpleasant. A time it takes for the deceleration magnitude adjustment manipulation is called a deceleration magnitude adjustment manipulation time TA (Time for Adjustment).

Since, however, this deceleration magnitude adjustment time TA is not considered in the above-described previously proposed anti-collision support system, the vehicle cannot make a stop at a desired point of location unless the vehicular driver continues such a braking operation as to maintain such a braking operation as to maintain the set deceleration Ga until the vehicle makes a stop. Consequently, there is an anxiety that the large nose dive would occur at the time of vehicular stop and a reactive shock would occur.

It is, hence, an object of the present invention to provide improved anti-collision support system and method for an automotive vehicle in which the alarm generating timing is determined with the time necessary to perform such a deceleration magnitude adjustment manipulation so as not to generate a large nose dive during a vehicular stop taken into consideration, the deceleration magnitude adjustment manipulation time being incorporated into the alarm generation timing in addition to the free running time Tb and the deceleration time Td and in which, if an automatic brake function is preferably installed in the vehicle, the automatic brake start timing is determined with the deceleration magnitude adjustment manipulation time TA taken into consideration in addition to the deceleration time Td.

The above-described object can be achieved by providing an anti-collision support system for an automotive vehicle, comprising: a vehicular stop position determining section that determines a stop position for the vehicle to be stopped based on a relative distance of the vehicle to a stop target object which provides a cause of an application of a brake to the vehicle; a deceleration start position determining section that determines a deceleration start position at which the vehicle is to start a vehicular deceleration for the vehicle to be stopped at the stop position from a vehicular velocity of the vehicle and the relative distance, the deceleration start position determining section comprising at least a deceleration distance calculating section that calculates a deceleration distance which is a vehicular running distance required for the vehicle to be decelerated and a deceleration magnitude manipulation adjustment distance calculating section that calculates a deceleration magnitude adjustment manipulation distance which is another vehicular running distance required to carry out a manipulation of an adjustment for a magnitude of the vehicular deceleration which would ordinarily be carried out at a time immediately before the vehicle is stopped; and an informing section enabled to inform a vehicular occupant of an approach of the vehicle to the stop target object while the relative distance is shorter than a distance of the vehicle to the deceleration start position and the stop target object.

The above-described object can also be achieved by providing an anti-collision support method for an automotive vehicle, comprising: determining a stop position for the vehicle to be stopped from a relative distance of the vehicle to a stop target object which provides a cause of an application of a brake to the vehicle; calculating a deceleration distance which is a vehicular running distance required for the vehicle to be decelerated from a vehicular velocity and the relative distance; calculating a deceleration magnitude adjustment manipulation distance which is another vehicular running distance required to carry out a manipulation of an adjustment for a magnitude of the vehicular deceleration which would ordinarily be carried out at a time immediately before the vehicle is stopped from the vehicular velocity and the relative distance; determining a deceleration start position at which the vehicle is to start a vehicular deceleration for the vehicle to be stopped at the stop position on the basis of at least the calculated deceleration distance and the calculated deceleration magnitude adjustment manipulation distance; and informing a vehicular occupant of an approach of the vehicle to the stop target object while the relative distance is shorter than a distance of the vehicle to the deceleration start position and the stop target object.

This summary of the invention does not necessarily describe all necessary features so that the invention may also be a sub-combination of these described features.

BRIEF DESCRIPTION OF THE DRAWINGS

FIG. 8 is a functional block diagram of the anti-collision support system for the automotive vehicle in a fourth preferred embodiment according to the present invention.

FIG. 9 is an operational flowchart corresponding to the control program executed by an alarm.brake controlling section in the anti-collision support system shown in FIG. 8.

DETAILED DESCRIPTION OF THE PREFERRED EMBODIMENTS

Reference will hereinafter be made to the drawings in order to facilitate a better understanding of the present invention.

(First Embodiment)

Figure 1:
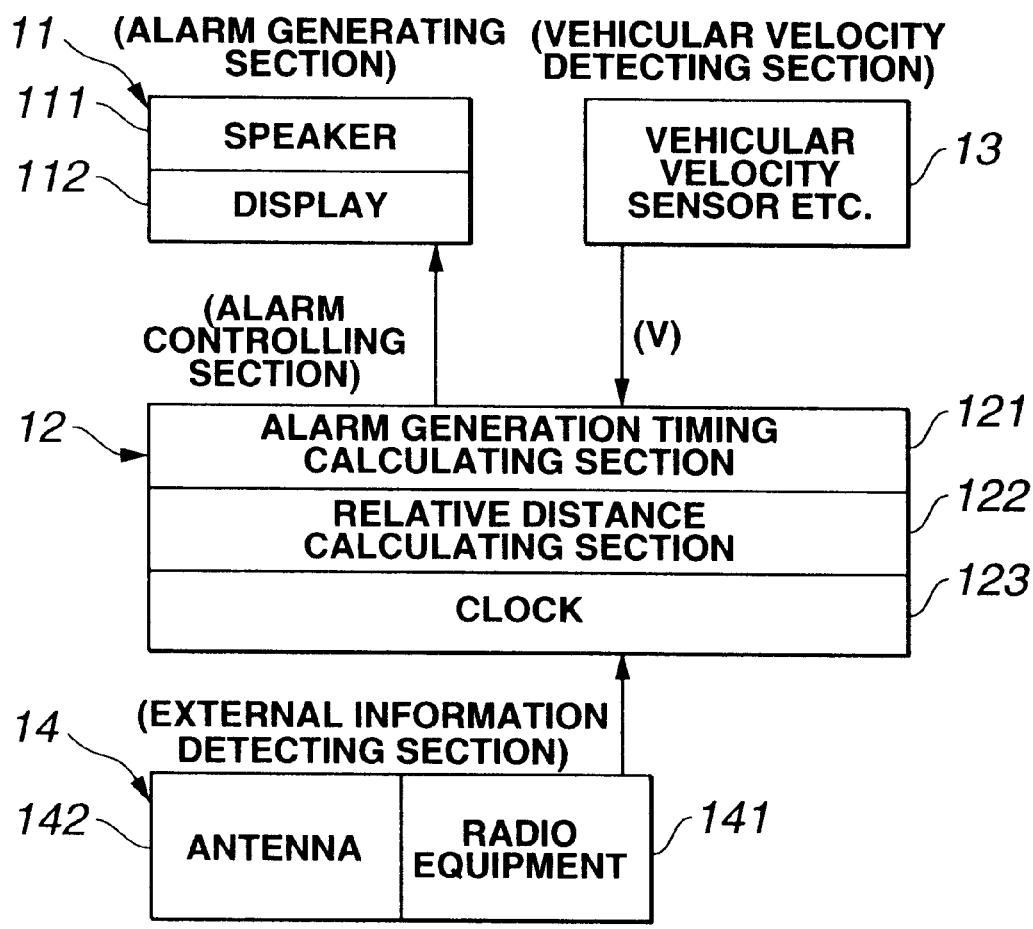
FIG. 1 is a functional block diagram of an anti-collision support system for an automotive vehicle in a first preferred embodiment according to the present invention.
Figure 2:
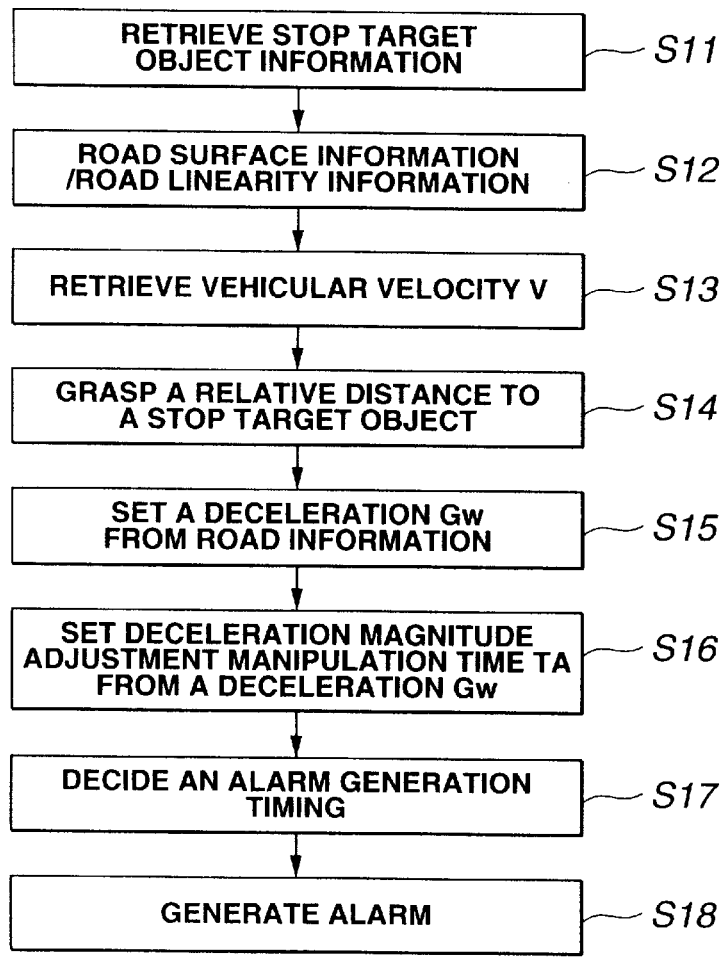
FIG. 2 is an operational flowchart corresponding to a control program executed by an alarm controlling section of the anti-collision support system shown in FIG. 1.

FIGS. 1 and 2 show an anti-collision support system for an automotive vehicle in a first preferred embodiment according to the present invention.

First, FIG. 1 shows a structure of the anti-collision support system applicable to an automotive vehicle. A reference numeral 12 denotes an alarm controlling section including an alarm generating timing calculating section 21; a relative distance calculating section 122 that calculates a relative distance to a stop target object such as an obstacle or as a temporary stop line; and a clock 123 to measure a time.

Alarm controlling section 12 receives a signal from a vehicular velocity detecting section 13 including a vehicular velocity sensor to detect a vehicular velocity V and a signal from an external information detecting section 14 including a radio equipment 141 and associated antenna 142 detecting a stop target information such as a preceding vehicle, an obstacle, and a temporary stop line at an intersection, each of which provides a cause of the vehicle (host vehicle) to be braked, a road surface information, and a road linearity information.

Alarm controlling section 12 determines where is a position for the vehicle to be braked on the basis of these input information and activates a speaker 111 in the alarm generating section 11 from a time point at which the vehicle has reached to the position to inform the vehicular occupant of the vehicle to be braked, displays sequentially to a display unit 112 in the alarm generating section 11, can visually display a control information through a display 112 at the alarm generating section 11 so as to be enabled to visually be maintained by the vehicular occupant (driver) at any time. It is noted that alarm generating section 11 corresponds to an informing section in a broad sense of the term.

Alarm controlling section 12 in the first preferred embodiment performs predetermined alarming and display as will be described below by executing a signal processing in accordance with a control procedure shown in FIG. 2. It is noted that alarm controlling section 12 includes a microcomputer having a CPU (Central Processing Unit), a RAM (Random Access Memory), a ROM (Read Only Memory), an Input Port, an Output Port, and a common bus.

In a case where the vehicle is running at a running interval on which information supplying apparatus (infrastructure) is installed and enters at a location where the obstacle or the temporary stop line required for the vehicle to be stopped, a program corresponding to a flowchart shown in FIG. 2 is run. That is to say, at a first step S11, alarm controlling section 12 receives the stop target object information such as the obstacle and the temporary stop line on a road surface located ahead of a vehicular forwarding direction from the information supplying apparatus on the road surface via antenna 14 from radio equipment 141.

Simultaneously, at a step S12, alarm controlling section 12 receives the road surface information such as a frictional coefficient on a road surface on which the vehicle is to run and the road linearity information such as a gradient of the road surface and a radius of curvature from external information detecting section 14, viz., radio equipment 141 via antenna 142.

At the next step S13, alarm controlling section 12 retrieves the vehicular velocity V detected by vehicular velocity detecting section 13. At the next step S14, alarm controlling section 12 calculates a relative distance L from the vehicle to the stop target object on the basis of a running distance derived by an integration for detected vehicular velocity V and stop target object information from external information detecting section 14 (as an action of relative distance calculating section 121 within alarm controlling section 12).

At the next step S15, alarm timing calculating section 121 of alarm controlling section 12 sets a deceleration Gw at a time of braking the vehicle according to road linearity information retrieved at step S12 and road surface information retrieved at the same step. The set deceleration Gw is a negative acceleration when the running velocity of the vehicle is decreased with a depression on a vehicular brake pedal and is preset as the vehicular deceleration which is generable according to the road linearity information and road surface information.

It is noted that, during a braking, such a series of operation s of brake ON→brake hold→brake OFF is repeatedly carried out by the vehicular driver and as vehicular velocity V becomes lower, the deceleration time Td becomes accordingly short so that respective minimum times required for the braking operation cannot sufficiently be taken.

Hence, at a step S17, alarm generation timing calculating section 121 of alarm controlling section 12 determines alarm generation timing so as to secure a minimum response time of human being. That is to say, in a case where the deceleration time Td is smaller than the minimum response time of human being, an additional time Tm is derived from a map varying as, for example, FIG. 3 (in a case where set deceleration Gw=5/m$^2$) in accordance with the set deceleration Gw and vehicular velocity V.

Figure 3:
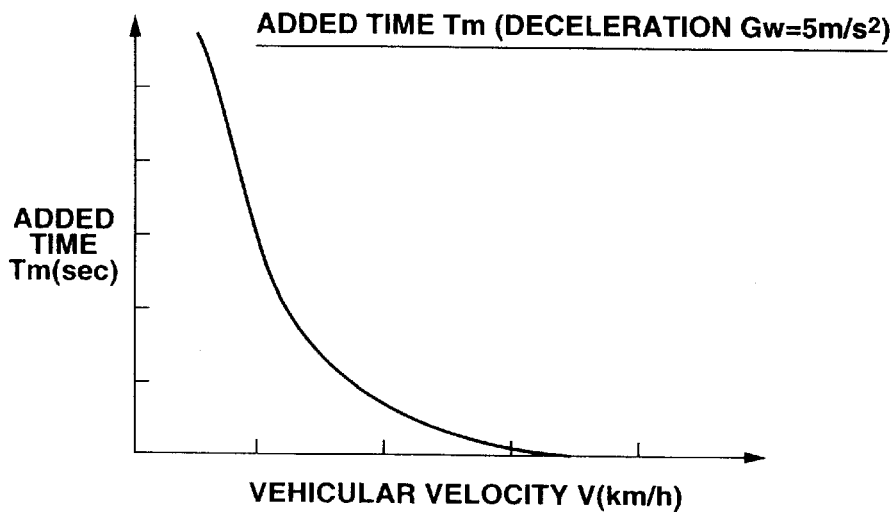
FIG. 3 is a characteristic graph representing a relationship between a deceleration magnitude adjustment manipulation time (TA) and a vehicular velocity.

The map related to additional time Tm for each set deceleration Gw exemplified in FIG. 3 is previously set by an experiment. The additional time Tm in accordance with vehicular velocity V with the minimum response time taken into consideration becomes larger as vehicular velocity V becomes faster and gives zero when vehicular velocity V is higher than a certain vehicular velocity. The reason of giving zero when vehicular velocity V is higher than the certain vehicular velocity is that, when vehicular velocity V becomes higher, deceleration time becomes long at the set deceleration Gw and when vehicular deceleration G due to the braking operation by the driver is slightly larger than set deceleration Gw, the time to perform deceleration adjustment operation can be created.

At step S17, alarm generation timing calculating section 121 of alarm controlling section 12 takes a sum of additional time Tm to a sum value of response (free running) time Tb and deceleration time Td according to the set deceleration Gw in order to determine alarm generation timing to secure the minimum response time of the human being. Thus, it becomes possible to perform a deceleration magnitude adjustment manipulation for the nose dive countermeasure. Specifically, alarm generation timing calculating section 121 calculates distance Lw by which the vehicle runs during the additional time Tm to enable deceleration magnitude adjustment manipulation. That is to say, suppose that deceleration G is a function G(t) with respect to a time t and this function G(t) is preset according to an experiment.

$$Lw = \int \int {}^t G(t) dt \qquad (1),$$

provided that t: 0→Tm.

In this way, alarm generation timing calculation section 121 calculates a distance Lw by which the vehicle runs for additional time Tm.

At step S17, thus, alarm generation timing calculating section 121 determines the alarm generation timing as a time when the vehicle approaches to the stop target object by a distance represented by a sum of this distance Lw, response distance (free running distance) Lb corresponding to response time (free running) Tb, and deceleration time Td due to the set deceleration Gw. At a step S18, alarm controlling section 12 activates speaker 111 in alarm generating section 11 at this timing to warningly inform the vehicular occupant of the approach of the vehicle to a braking position. It is noted that display 112 of alarm generating section 11 continues to always display each kind of information not only during the alarm generation but also at any time enabled to visually recognize the current situation therethrough. On the other hand, there is a possibility of exceeding deceleration G by the driver's manipulation Gz on the map described above with reference to FIG. 3 on which only the response time of the human being is considered in a case where set deceleration Gw is set in the proximity to a limit deceleration Gz on an environment on which the vehicle is running. The additional time, in this case, is calculated in the alarm generation timing controlling section 121 as follows: At step S16, deceleration magnitude adjustment manipulation time TA to perform the deceleration adjustment operation for a prevention of nose dive is set in the following way from vehicular velocity V and set deceleration Gw. It is noted that deceleration magnitude adjustment manipulation time TA is derived by carrying out the following arithmetic operation using a basic time $TA_0$ of deceleration magnitude adjustment manipulation time TA, vehicular velocity V, and set deceleration Gw:

$$TA = TA_0 + (a \times V + b \times Gw) \qquad (2),$$

wherein $TA_0$, a, and b denote numerical values predetermined in such a manner that deceleration magnitude adjustment manipulation time $T_A$ matches with an actual deceleration magnitude adjustment manipulation for a brake manipulator such as a vehicular brake pedal. At the next step S17, the alarm generation timing calculating section 121 calculates distance La by which the vehicle is running during deceleration magnitude adjustment manipulation time TA using the following equation (3). In details, assuming that deceleration G is a function G(t) with respect to a time t and the function G(t) is preset by experiments, distance La by which the vehicle is running during deceleration magnitude adjustment manipulation time TA is calculated.

$$La = \int \int {}^t G(t) \cdot dt \qquad (3),$$

provided that t: 0→TA. At the same step S17, alarm generation timing calculating section 121 furthermore determines a time at which the vehicle approaches to the stop target object by the distance which is represented by the sum of distance La, response (free running) distance Lb, and deceleration distance Ld corresponding to deceleration time Td by set deceleration Gw as the alarm generation timing. At the next step S18, alarm controlling section 12 activates speaker 111 in alarm generating section 11 at this timing to inform the vehicular occupant of the approach of the vehicle at the braking position. The display 112 in alarm generation section 11 continues to always display each kind of information so as to enable the visual recognition of the current situation at any time including the alarm generation.

In the first embodiment described above, the alarm controlling section 12 determines a vehicular stop position for the vehicle to be stopped from relative distance L to the stop target object which provides a cause of the vehicle to be braked; determines the deceleration start position for the vehicle to be stopped at the stop position from the vehicular velocity V of the vehicle and relative distance L; and issues the alarm to the effect that the vehicle should be braked while relative distance L is shorter than the distance to the deceleration start position and is shorter than the distance to the stop target object.

Since the deceleration start position is determined from deceleration distance Ld which is a running distance required for deceleration, response distance Lb, and deceleration adjustment distance La (Lm) taken into consideration. The deceleration adjustment operation can be carried out by vehicular driver so s to prevent the large nose dive from being generated and the reactive shock is not generated at a time immediately before the vehicle has stopped. Consequently, there is no anxiety of such a large nose dive and reactive shock as described above.

It is noted that since deceleration adjustment distance La (Lm) is set to become larger as vehicular velocity V becomes larger, as shown by FIG. 3, deceleration adjustment distance La (Lm) exactly corresponds to a demand such that the deceleration adjustment operation for nose dive purpose requires a minute operation and the above-described action and advantage can easily be achieved under a vehicular velocity. Under any vehicular velocity, the above-described action and effect can be achieved.

Since the above deceleration distance Ld is derived on the basis of vehicular deceleration ratio Gw which is generable according to the road situation, the above-described action and effect can be achieved without failure even if the vehicular deceleration is varied according to road situation.

Furthermore, vehicular deceleration G(t) which is the function of time t as described above is varied according to vehicular velocity V and set deceleration Gw as described in the following equation (4).

However, $$G(t) = (Gw/TA) \times t \qquad (4),$$

if the variation in deceleration during deceleration adjustment is constant or a combination of functions is carried out, deceleration adjustment distance La may simply be induced.

Figure 4:
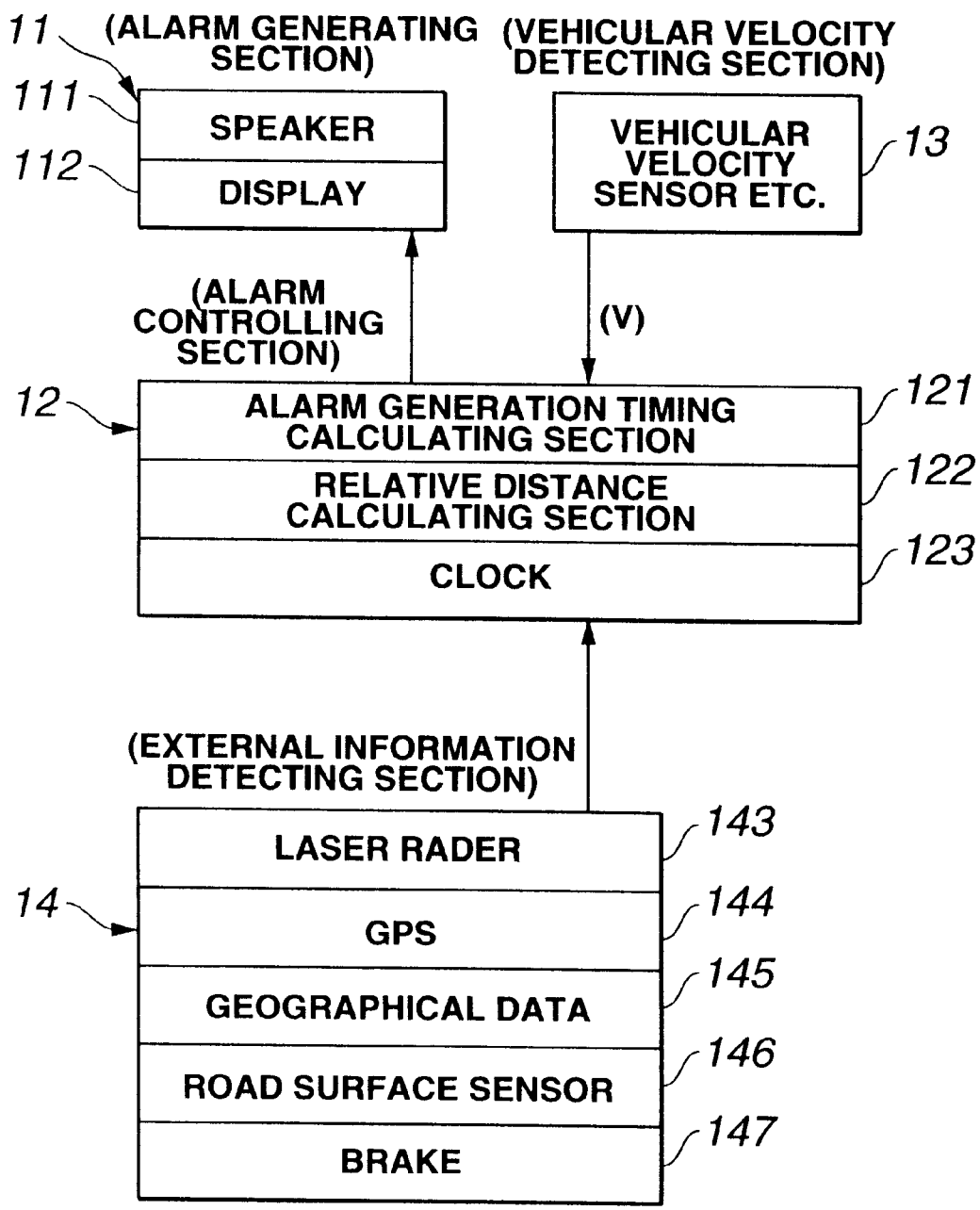
FIG. 4 is a functional block diagram of the anti-collision support system in an alternative to the first preferred embodiment.

FIG. 4 shows an alternative of the anti-collision support system in the first embodiment shown in FIG. 1. Although, in FIG. 1, the relative distance, road linearity information, and road surface frictional coefficient are obtained from an external information, such a distance measuring apparatus as laser radar 143 may be used to measure the relative distance to the stop target object, a GPS (Global Positioning System) 144 or road map data 145 may be used to retrieve road linearity information, and road surface sensor 146 and brake 147 may be used to detect a road surface frictional coefficient, as shown in FIG. 4. In this way, the relative distance to the stop target object, the road linearity information, and road surface frictional coefficient may be retrieved using pieces of equipment mounted on the vehicle.

(Second Embodiment)

Figure 5:
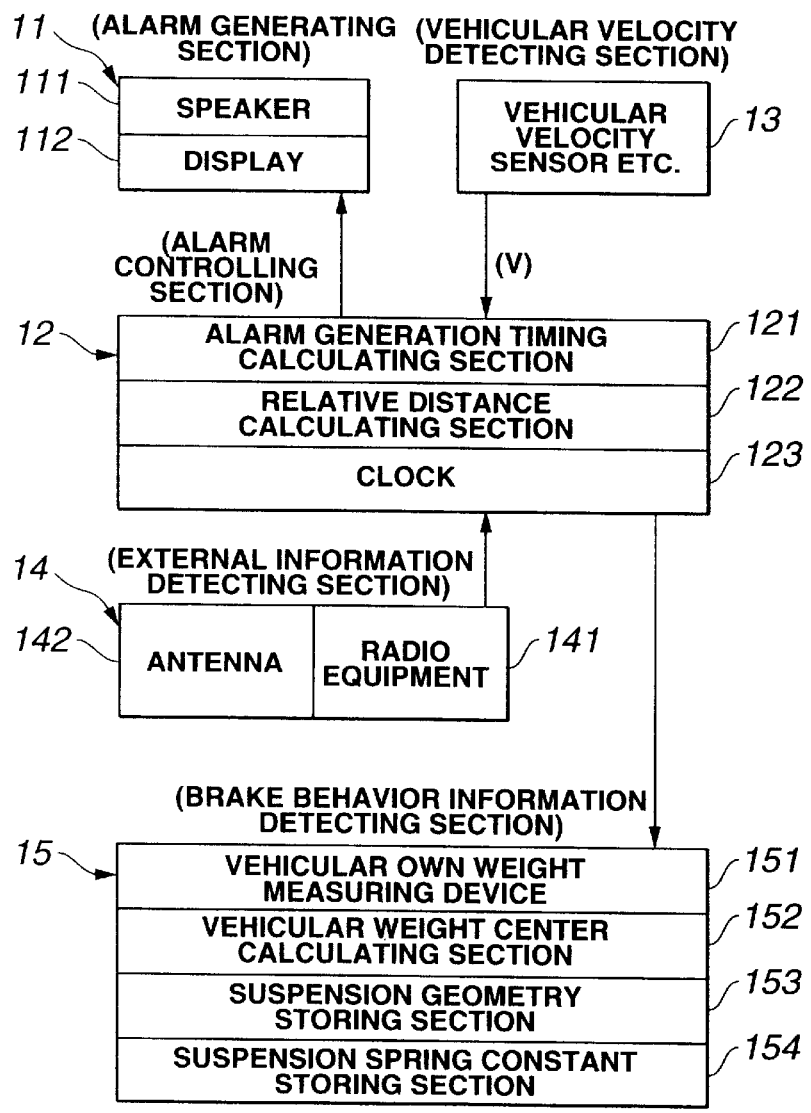
FIG. 5 is a functional block diagram of the anti-collision support system for the automotive vehicle in a second preferred embodiment according to the present invention.

FIG. 5 shows a second preferred embodiment of the anti-collision support system for the automotive vehicle according to the present invention.

In the second embodiment, such a braking time vehicular behavior information detecting section 15 as shown in FIG. 5 is added to the system shown in FIG. 1.

Braking time vehicular behavior information detecting section 15 detects the information related to a behavior of the vehicle during the braking (mainly, the nose dive) and includes: a vehicular own weight measuring device 151; a vehicular weight center calculating section 152; a suspension geometry storing section 153; and a suspension spring constant storing section 154. Braking time vehicular behavior information detecting section 15 detects the behavior of the vehicle (mainly, the nose dive) during the braking as follows on the basis of these pieces of information. In details, suppose that the vehicular deceleration is Gw, the vehicular unsprung mass weight is W, a wheel base is Lh, a height of vehicular weight center is Hg, a front left or right road wheel end spring constant is $\lambda f$, a front brake distribution is N, a front road wheel instantaneous center of revolution longitudinal direction position Lf, and a ground height position of front road wheel instantaneous revolution center is Hf. The nose dive quantity can be determined in the following equation (5):

$$Ff=(Hg \times Lf/Lh-Hf \times N) \times Gw \times W/(2 \times \lambda f \times Lf) \quad (5).$$

A suspension stroke measuring instrument constituting vehicular own weight measuring device 151 is installed on each suspension of the vehicle, measures a suspension stroke at the time of vehicular stop and calculates a weight applied to each suspension section corresponding to each stroke length. Then, vehicular weight center calculating section 152 calculates vehicular unsprung mass weight W and height of vehicular weight center from the result of calculation at the vehicular own weight measuring device 151.

Figure 6:
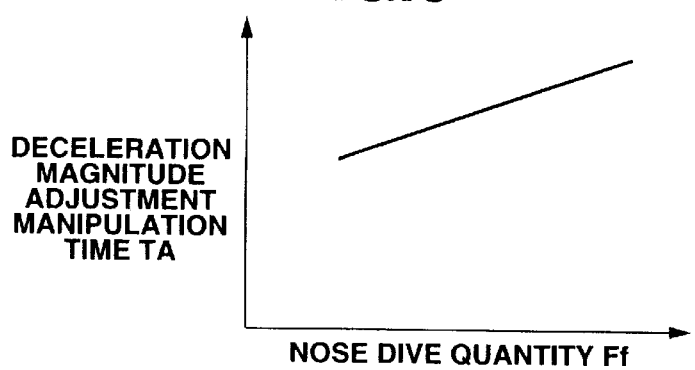
FIG. 6 is a characteristic graph representing a relationship between a deceleration magnitude adjustment manipulation time TA and a nose dive quantity Ff.

On the basis of the result of calculation, the above described series of calculations are advanced to derive the nose dive quantity Ff. Alarm generation timing calculating section 121 within alarm controlling section 12 determines deceleration magnitude adjustment manipulation time TA on the basis of the map exemplified by FIG. 6 from nose dive quantity Ff. If it is predicted that nose dive quantity Ff becomes large, deceleration magnitude adjustment manipulation time TA is set to be longer to adjust a reaction of nose dive.

In the second embodiment, deceleration magnitude adjustment manipulation distance La is determined with vehicular weight, load mount quantity, vehicular weight center position, and a performance of the suspension taken into consideration.

Consequently, in the second embodiment, the action and advantages can be achieved without failure even if a generation situation of nose dive is varied according to the vehicular condition.

(Third Embodiment)

Figure 7:
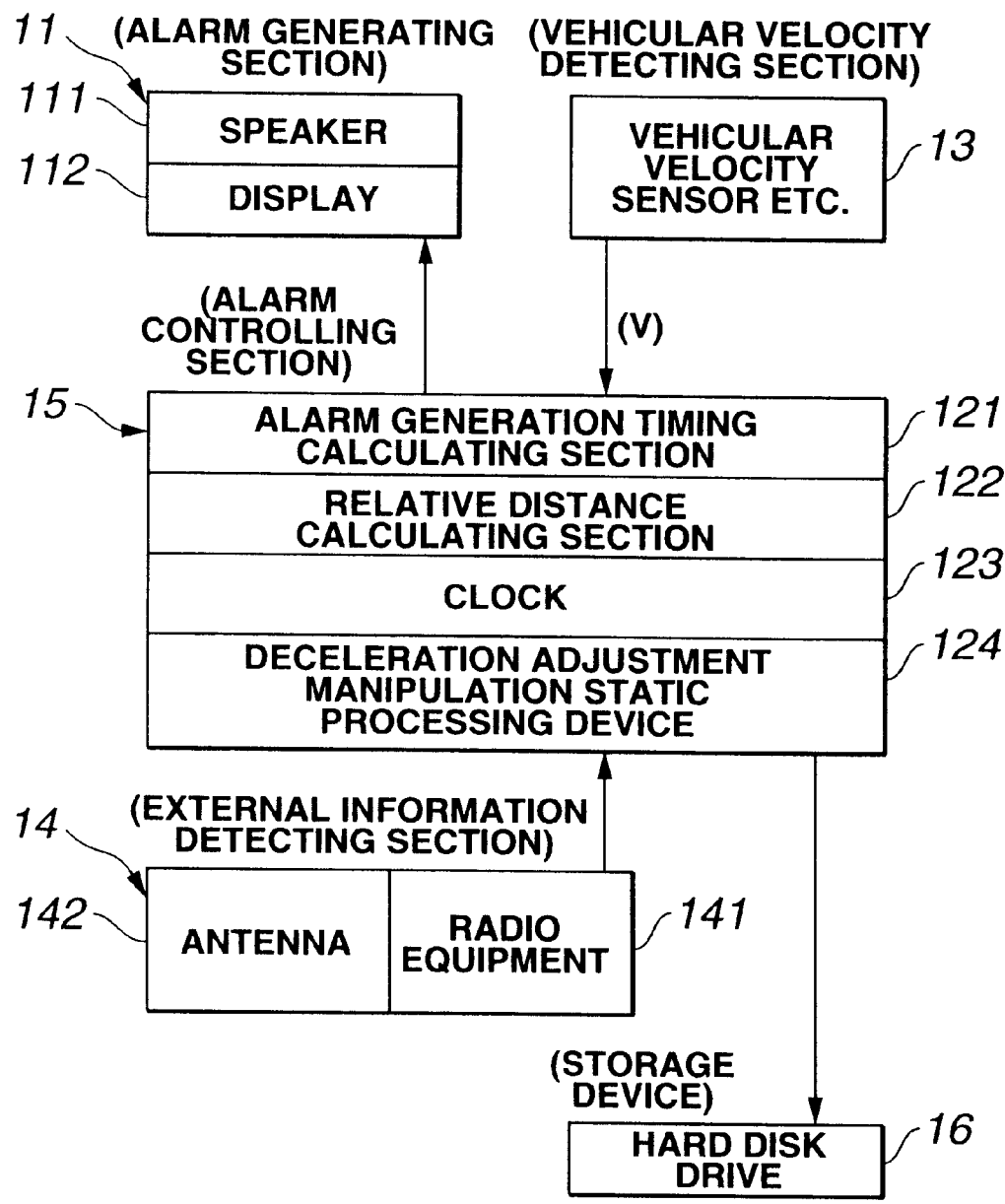
FIG. 7 is a functional block diagram of the anti-collision support system for the automotive vehicle in a third preferred embodiment according to the present invention.

FIG. 7 shows a third preferred embodiment of the anti-collision support system for the automotive vehicle according to the present invention.

In the third embodiment, a storage device 16 is added to the system shown in FIG. 1 and a deceleration magnitude adjustment manipulation static processing device 124 is added to alarm controlling section 12.

Storage device 16 is constituted by a hard disk drive (HDD) and stores a relationship between a speed of the deceleration adjustment manipulation carried out to relieve the nose dive at a time immediately before the vehicle stop by vehicular driver. Deceleration adjustment operation (manipulation) static processing device 124 calculates a tendency of the deceleration adjustment operation to be ordinarily carried out according to the contents of memory and learns a peculiarity of deceleration adjustment manipulation by vehicular driver.

Alarm generation timing calculating section 121 in alarm controlling section 12 determines the alarm generation timing with the peculiarity in the deceleration adjustment manipulation carried out to relieve the nose dive by the vehicular driver taken into consideration. For example, in a case where the deceleration magnitude adjustment manipulation time TA ordinarily carried out by the vehicular driver is so short that a reaction to the nose dive has a tendency to make a relatively large stop manipulation, such an operation as to reduce basic time $TA_0$ in the equation (2) which accords with the deceleration magnitude adjustment manipulation time related to the vehicular driver.

In the third embodiment, deceleration magnitude adjustment manipulation distance La is determined with data read from storage device 16 learning the relationship between the deceleration magnitude adjustment manipulation time TA required for by the vehicular driver and the vehicular deceleration taken into consideration, the driver's peculiarity is reflected on the deceleration manipulation adjustment manipulation. Hence, even if the peculiarity in deceleration magnitude adjustment manipulation is different for each vehicular driver, the above-described action and effect can be achieved without failure.

(Fourth Embodiment)

FIGS. 8 and 9 show a fourth preferred embodiment of the anti-collision support system according to the present invention. In the fourth embodiment, an automatic brake system 17 is added to the system of the first embodiment shown in FIGS. 1 and 2.

FIG. 8 shows a system configuration of the anti-collision support system in the fourth preferred embodiment.

In FIG. 8, an alarm.brake controlling section 22 is installed in place of alarm controlling section 12. The alarm.brake controlling section 22 includes alarm generation timing calculation section 121; relative distance calculating section 122; clock 123; and automatic brake timing calculating section 221.

Automatic brake timing calculating section 221 determines a brake start timing as will be described later. At the brake timing, a transmission 171 constituting the brake system 17 is down shifted to apply a braking effect. In addition, when the brake 172 constituting the brake system 17 is activated to perform a predicted automatic braking.

FIG. 9 shows an operational flowchart of the alarm and braking carried out by the alarm brake section 22. It is noted that, in the braking manipulation by the driver, it is necessary to determine alarm generation timing with deceleration Gw set with a deviation of deceleration to some degree taken into consideration. However, in the case of the automatic braking, constant and accurate decelerations can be made as compared with the case where the manual brake is carried out by the human being. In addition, the response delay as the human being often does can be neglected and the response time (free running) is not present. Hence, the automatic brake control can be initiated upon the alarm generation timing described in the case of each of the above-described first through third preferred embodiments.

Hence, the alarming operation may be carried out at the same timing as this automatic braking start timing described in the fourth embodiment. The automatic braking start timing is determined with the deceleration magnitude adjustment manipulation time TA to relieve the nose dive at the time of vehicular stop taken into consideration so as to enable the reduction of reaction by the nose dive.

Therefore, suppose that the vehicle is running on the running interval of road on which the road information supplying apparatus is installed and enters at the location where the obstacle or temporary stop line required for the vehicle to be stopped at is present. Ten, at a step S21, the alarm.brake controlling section 22 receives the information of the stop target object such as the obstacle on the road located in the vehicular forwarding direction from the road information supplying apparatus via radio equipment 141 and antenna 142.

Simultaneously, at a step S22, the road surface information such as a frictional coefficient on a running road surface and the road linearity information such as gradient and radius of curvature of the running road are received from radio equipment 141 via antenna 142.

At the next step S23, alarm.braking controlling section 22 receives vehicular velocity V detected by detecting section 13. At the next step S24, alarm, braking controlling section 22 calculates relative distance L from the vehicle to the step target obstacle according to a running distance obtained by integrating vehicular velocity V and stop target object information (the action of relative distance calculating section 12).

At the next step S25, the automatic braking timing calculating section 221 within alarm, braking controlling section 22 sets deceleration Ga during the braking of the host vehicle from the road linearity information and the road surface information received at step S22.

Set deceleration Ga is a negative acceleration when the automatic braking causes the vehicular velocity V to be decreased and can be preset as vehicular deceleration generable according road linearity information and road surface information.

At the next step S26, deceleration magnitude adjustment manipulation time TA to perform deceleration adjustment manipulation carried out for a prevention of occurrence in nose dive from vehicular velocity V and set deceleration Gw using the following equation (6).

$$TA=TA_0+(a \times V+b \times Ga) \quad (6),$$

wherein $TA_0$, a and b denote numerical values preset according to an experiment thereof.

At the next step S27, automatic braking timing calculating section 221 determines a time at which the vehicle approaches to the stop target object by the distance represented by a sum of distance La and deceleration distance Ld corresponding to deceleration time Td by set deceleration Ga as automatic braking start timing.

At a step S28, at the automatic braking start timing, alarm.braking controlling section 22 decelerates the vehicle by making a downshift of transmission 171 constituting automatic brake system 17 and/or operating brake 172 of automatic brake system. At the next step S29, alarm.braking controlling section 22 stops the vehicle.

In the fourth embodiment, the stop position for the vehicle to be stopped is determined from relative distance L to the stop target object which provides a cause of the vehicle to be braked and from the deceleration start position for the vehicle to be stopped according to the vehicular velocity V and relative distance L and the vehicle is automatically braked and decelerated while relative distance L is shorter than the distance to the deceleration start position and is shorter than the distance to the stop target object. Since the deceleration start position is determined from the deceleration distance Ld required for the deceleration by automatic braking and deceleration magnitude adjustment manipulation distance La which is the running distance required for deceleration magnitude adjustment manipulation to relieve nose dive at a time immediately before the vehicular stop. There is no anxiety that the reactive shock occurs due to the occurrence in the large nose dive during the vehicular stop since the deceleration magnitude adjustment manipulation distance is incorporated into the automatic braking start timing.

Since, in the above-described automatic braking, deceleration magnitude adjustment manipulation distance La can be determined with the vehicular weight, the load amount, the vehicular weight center position, and the performance of the suspension taken into consideration, in this case, the same action and advantages can be achieved even if the generation situation of the nose dive is varied according to the vehicular state.

In addition, in the fourth embodiment, deceleration magnitude adjustment manipulation distance La can be determined with the data obtained from the storage device (memory) learning the relationship between the time for deceleration magnitude adjustment manipulation and vehicular deceleration taken into consideration in the same way as described in the third embodiment. In this case, since the driver's peculiarity is reflected on deceleration magnitude adjustment manipulation distance La, the same action and advantages can be achieved if the peculiarity to the deceleration adjustment manipulation is different for each vehicular driver.

The entire contents of a Japanese Patent Application No. 2000-311446 (filed in Japan on Oct. 12, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An anti-collision support system for an automotive vehicle, comprising:
   a vehicular stop position determining section that determines a stop position for the vehicle to be stopped from a relative distance of the vehicle to a stop target object which provides a cause of an application of a brake to the vehicle;
   a deceleration start position determining section that determines a deceleration start position at which the vehicle is to start a vehicular deceleration for the vehicle to be stopped at the stop position from a vehicular velocity of the vehicle and the relative distance, the deceleration start position determining section comprising at least a deceleration distance calculating section that calculates a deceleration distance which is a vehicular running distance required for the vehicle to be decelerated and a deceleration magnitude adjustment manipulation distance calculating section that calculates a deceleration magnitude adjustment manipulation distance which is another vehicular running distance required to carry out a manipulation of an adjustment for a magnitude of the vehicular deceleration which would ordinarily be carried out at a time immediately before the vehicle is stopped; and an informing section enabled to inform a vehicular occupant of an approach of the vehicle to the stop target object while the relative distance is shorter than a distance of the vehicle to the deceleration start position and the stop target object.

2. An anti-collision support system for an automotive vehicle as claimed in claim 1, wherein the deceleration start position determining section further comprises a response distance calculating section that calculates a response distance which is a still another vehicular running distance from a time point at which a vehicular driver is started to be informed of the approach of the vehicle to the stop target object by the informing section to a time point at which the vehicular driver responsively carries out a manipulation of a brake manipulator to apply the brake to the vehicle and wherein the informing section comprises an alarm generating section that produces an alarm when the vehicle approaches to the stop target object by a distance which is the sum of the deceleration distance, the response distance, and the deceleration magnitude adjustment manipulation distance.

3. An anti-collision support system for an automotive vehicle as claimed in claim 2, wherein the deceleration magnitude adjustment manipulation distance calculating section calculates the deceleration magnitude adjustment manipulation in such a manner that, as the vehicular velocity becomes lower, the deceleration magnitude adjustment manipulation distance becomes longer.

4. An anti-collision support system for an automotive vehicle as claimed in claim 2, wherein the deceleration distance calculating section calculates the deceleration distance on the basis of the vehicular deceleration which is generable according to a situation of a road on which the vehicle is to run.

5. An anti-collision support system for an automotive vehicle as claimed in claim 2, wherein the deceleration magnitude adjustment manipulation distance calculating section calculates the deceleration magnitude adjustment manipulation distance with a vehicular weight, a load amount of the vehicle, a vehicular weight center position, and a performance of a vehicular suspension system taken into consideration.

6. An anti-collision support system for an automotive vehicle as claimed in claim 2, wherein the deceleration magnitude adjustment manipulation distance calculating section calculates the deceleration magnitude adjustment manipulation distance with data read from a memory learning a relationship between a time duration for which the vehicular driver manipulates the adjustment for the magnitude of the vehicular deceleration and the vehicular deceleration taken into consideration.

7. An anti-collision support system for an automotive vehicle as claimed in claim 1, further comprising an automatic brake system that automatically applies the brake to the vehicle while the relative distance is shorter than the distance of the vehicle to the deceleration start position and stop target object.

8. An anti-collision support system for an automotive vehicle as claimed in claim 7, wherein the deceleration magnitude adjustment manipulation distance calculating section calculates the deceleration magnitude adjustment manipulation distance with a vehicular weight, a load amount of the vehicle, a vehicular weight center position, and a performance of a vehicular suspension system taken into consideration.

9. An anti-collision support system for an automotive vehicle as claimed in claim 7, wherein the deceleration magnitude adjustment manipulation distance calculating section calculates the deceleration magnitude adjustment manipulation distance with data read from a memory learning a relationship between a time duration for which the vehicular driver manipulates the adjustment for the magnitude of the vehicular deceleration and the vehicular deceleration taken into consideration.

10. An anti-collision support method for an automotive vehicle, comprising:

determining a stop position for the vehicle to be stopped from a relative distance of the vehicle to a stop target object which provides a cause of an application of a brake to the vehicle;

calculating a deceleration distance which is a vehicular running distance required for the vehicle to be decelerated from a vehicular velocity and the relative distance;

calculating a deceleration magnitude adjustment manipulation distance which is another vehicular running distance required to carry out a manipulation of an adjustment for a magnitude of the vehicular deceleration which would ordinarily be carried out at a time immediately before the vehicle is stopped from the vehicular velocity and the relative distance;

determining a deceleration start position at which the vehicle is to start a vehicular deceleration for the vehicle to be stopped at the stop position on the basis of at least the calculated deceleration distance and the calculated deceleration magnitude adjustment manipulation distance; and informing a vehicular occupant of an approach of the vehicle to the stop target object while the relative distance is shorter than a distance of the vehicle to the deceleration start position and to the stop target object.

11. An anti-collision support method for an automotive vehicle as claimed in claim 10, further comprising calculating a response distance which is a still another vehicular running distance from a time point at which a vehicular driver is started to be informed of the approach of the vehicle to the stop target object to a time point at which the vehicular driver responsively carries out a manipulation of a brake manipulator to apply the brake to the vehicle, wherein, when determining the deceleration start position, the response distance is added in addition to the deceleration distance and the deceleration magnitude adjustment manipulation distance, and further comprising producing an alarm when the vehicle approaches to the stop target object by a distance which is a sum of the deceleration distance, the response distance, and the deceleration magnitude adjustment manipulation distance.

12. An anti-collision support method for an automotive vehicle as claimed in claim 11, further comprising: detecting the vehicular velocity; calculating the relative distance of the vehicle to the stop target object according to the detected vehicular velocity and an information on the stop target object; setting a magnitude of the vehicular deceleration which corresponds to the vehicular deceleration distance according to a road linearity information and a road surface information; and calculating a deceleration magnitude adjustment manipulation time for which the adjustment for the deceleration magnitude is enabled to be manipulated according to the detected vehicular velocity and the set magnitude of the vehicular deceleration and wherein the deceleration magnitude adjustment manipulation distance is calculated according to the deceleration magnitude adjustment manipulation time.

13. An anti-collision support method for an automotive vehicle as claimed in claim 12, wherein, when the deceleration magnitude adjustment manipulation time is calculated, the deceleration magnitude manipulation adjustment time becomes longer as the detected vehicular velocity becomes lower.

14. An anti-collision support method for an automotive vehicle as claimed in claim 11, wherein, when the deceleration magnitude adjustment manipulation distance is calculated, a vehicular weight, a load amount of the vehicle, a vehicular weight center position, and a performance of a vehicular suspension system is taken into consideration.

15. An anti-collision support method for an automotive vehicle as claimed in claim 11, wherein, when the deceleration magnitude adjustment manipulation distance is calculated, data read from a memory learning a relationship between a time duration for which the vehicular driver manipulates the adjustment for the magnitude of the vehicular deceleration and the vehicular deceleration is taken into consideration.

16. An anti-collision support method for an automotive vehicle as claimed in claim 10, further comprising providing an automatic brake system that automatically applies the brake to the vehicle while the relative distance is shorter than the distance of the vehicle to the deceleration start position and is shorter than the distance of the vehicle to the stop target object.

17. An anti-collision support method for an automotive vehicle as claimed in claim 16, further comprising automatically applying the brake to the vehicle through the automatic brake system from a time at which the vehicle approaches to the stop target object by a distance which is a sum of the deceleration distance and the deceleration magnitude adjustment manipulation distance.

18. An anti-collision support method for an automotive vehicle as claimed in claim 17, wherein, when the deceleration magnitude adjustment manipulation distance is calculated, a vehicular weight, a load amount of the vehicle, a vehicular weight center position, and a performance of a vehicular suspension system is taken into consideration.

19. An anti-collision support method for an automotive vehicle as claimed in claim 17, wherein, when the deceleration magnitude adjustment manipulation distance is calculated, data read from a memory learning a relationship between a time duration for which the vehicular driver manipulates the adjustment for the magnitude of the vehicular deceleration and the vehicular deceleration is taken into consideration.

20. An anti-collision support system for an automotive vehicle, comprising:

vehicular stop position determining means for determining a stop position for the vehicle to be stopped from a relative distance of the vehicle to a stop target object which provides a cause of an application of a brake to the vehicle;

deceleration start position determining means for determining a deceleration start position at which the vehicle is to start a vehicular deceleration for the vehicle to be stopped at the stop position from a vehicular velocity of the vehicle and the relative distance, the deceleration start position determining means comprising at least deceleration distance calculating means for calculating a deceleration distance which is a vehicular running distance required for the vehicle to be decelerated and deceleration magnitude adjustment manipulation distance calculating means for calculating a deceleration magnitude adjustment manipulation distance which is another vehicular running distance required to carry out a manipulation of an adjustment for a magnitude of the vehicular deceleration which would ordinarily be carried out at a time immediately before the vehicle is stopped; and informing means for informing a vehicular occupant of an approach of the vehicle to the stop target object while the relative distance is shorter than a distance of the vehicle to the deceleration start position and the stop target object.

21. An anti-collision support system for an automotive vehicle, comprising:

a vehicular stop position determining section that determines a stop position for the vehicle to be stopped from a relative distance of the vehicle to a stop target object which provides a cause of an application of a brake to the vehicle;

a deceleration start position determining section that determines a deceleration start position at which the vehicle is to start a vehicular deceleration for the vehicle to be stopped at the stop position from a vehicular velocity of the vehicle and the relative distance, the deceleration start position determining section comprising at least a deceleration distance calculating section that calculates a deceleration distance which is a first vehicular running distance required for the vehicle to be decelerated and a deceleration magnitude adjustment manipulation distance calculating section that calculates a deceleration magnitude adjustment manipulation distance which is a second vehicular running distance required to carry out a manipulation of an adjustment for a magnitude of the vehicular deceleration which would be carried out at a time immediately before the vehicle is stopped; and an informing section adapted to inform a vehicular occupant of an approach of the vehicle to the stop target object while the relative distance is shorter than a distance of the vehicle to the deceleration start position and the stop target object.

* * * * *